(12) United States Patent
Su

(10) Patent No.: US 9,232,556 B2
(45) Date of Patent: Jan. 5, 2016

(54) USER EQUIPMENT WITH IMPROVED TUNE-AWAY PERFORMANCE DURING MEASUREMENT

(71) Applicant: Apple Inc., Cupertino, CA (US)

(72) Inventor: Li Su, San Jose, CA (US)

(73) Assignee: Apple Inc., Cupertino, CA (US)

( * ) Notice: Subject to any disclaimer, the term of this patent is extended or adjusted under 35 U.S.C. 154(b) by 68 days.

(21) Appl. No.: 14/254,087

(22) Filed: Apr. 16, 2014

(65) Prior Publication Data

US 2015/0257199 A1    Sep. 10, 2015

Related U.S. Application Data

(60) Provisional application No. 61/948,834, filed on Mar. 6, 2014.

(51) Int. Cl.
*H04W 88/06* (2009.01)
*H04W 76/04* (2009.01)
*H04W 52/02* (2009.01)

(52) U.S. Cl.
CPC ........ *H04W 76/048* (2013.01); *H04W 52/0232* (2013.01)

(58) Field of Classification Search
CPC ..................................................... H04W 88/06
USPC .......................................... 455/552.1, 553.1
See application file for complete search history.

(56) References Cited

U.S. PATENT DOCUMENTS

| | | | | |
|---|---|---|---|---|
| 7,852,818 B2 * | 12/2010 | Feder | ................. | H04N 21/4122 370/338 |
| 8,442,570 B1 | 5/2013 | Shetty et al. | | |
| 8,605,652 B1 * | 12/2013 | Singh | ...................... | H04L 69/28 370/328 |
| 8,731,605 B1 * | 5/2014 | Shetty | ................... | H04W 48/18 455/435.2 |
| 2004/0106409 A1 * | 6/2004 | Roberts | ............. | H04W 36/0066 455/436 |
| 2005/0181799 A1 * | 8/2005 | Laroia | .................... | H04B 17/24 455/450 |
| 2007/0030830 A1 * | 2/2007 | Sagne | ................... | H04L 12/189 370/336 |
| 2007/0097931 A1 * | 5/2007 | Parekh | .................. | H04W 56/00 370/338 |
| 2008/0139243 A1 * | 6/2008 | Lin | ........................ | H04B 1/006 455/553.1 |
| 2013/0023275 A1 * | 1/2013 | Mutya | ................... | H04W 88/06 455/452.1 |
| 2013/0201890 A1 * | 8/2013 | Swaminathan | ....... | H04W 88/06 370/311 |
| 2013/0244660 A1 | 9/2013 | Kumar et al. | | |
| 2013/0267267 A1 * | 10/2013 | Mujtaba | ............ | H04W 36/0066 455/509 |
| 2013/0344910 A1 * | 12/2013 | Xing | ...................... | H04W 68/12 455/515 |

(Continued)

FOREIGN PATENT DOCUMENTS

WO    2014117390    8/2014

*Primary Examiner* — Christopher M Brandt
(74) *Attorney, Agent, or Firm* — Meyertons Hood Kivlin Kowert & Goetzel, P.C.; Jeffrey C. Hood; Joel L. Stevens

(57) ABSTRACT

Operating a user equipment (UE) which comprises a first radio that is configured to operate according to a first radio access technology (RAT) and a second RAT. The UE may receive a request to perform a tune away operation for the second RAT while performing measurement for the first RAT (e.g., intra-cell measurement, inter-cell measurement, and/or inter-RAT measurement). Instead of waiting to complete the measurement of the first RAT, the UE may tune the radio to a frequency of the second RAT to perform the tune away operation (e.g., page decoding) for the second RAT. After completing the tune away operation of the second RAT, the UE may tune the radio back to a frequency corresponding to the first RAT in order to continue the measurement operations of the first RAT.

20 Claims, 15 Drawing Sheets

(56) References Cited

U.S. PATENT DOCUMENTS

| | | | |
|---|---|---|---|
| 2014/0119345 A1* | 5/2014 | Sikri | H04W 76/048 370/336 |
| 2014/0120925 A1* | 5/2014 | Kanthala | H04W 72/04 455/450 |
| 2014/0254549 A1* | 9/2014 | Lee | H04W 36/24 370/331 |
| 2015/0098445 A1* | 4/2015 | Chakravarthy | H04W 36/14 370/331 |
| 2015/0237597 A1* | 8/2015 | Kanamarlapudi | H04W 68/005 455/458 |

* cited by examiner

USER EQUIPMENT WITH IMPROVED TUNE-AWAY PERFORMANCE DURING MEASUREMENT

PRIORITY INFORMATION

The present application claims benefit of priority of U.S. Provisional Application Ser. No. 61/948,834, titled "User Equipment with Improved Tune-Away Performance During Measurement", whose inventor is Li Su, which was filed on Mar. 6, 2014, and which is hereby incorporated by reference in its entirety as though fully and completely set forth herein.

FIELD OF THE INVENTION

The present application relates to wireless devices, and more particularly to a system and method for providing improved performance and/or reduced power consumption in wireless devices that support multiple radio access technologies (RATs).

DESCRIPTION OF THE RELATED ART

Wireless communication systems are rapidly growing in usage. Further, wireless communication technology has evolved from voice-only communications to also include the transmission of data, such as Internet and multimedia content. Therefore, improvements are desired in wireless communication. In particular, the large amount of functionality present in a user equipment (UE), e.g., a wireless device such as a cellular phone, can place a significant strain on the battery life of the UE. Further, where a UE is configured to support multiple radio access technologies (RATs), certain performance degradations can occur on one or more of the RATs, such as due to tune-away operations of the other RAT. As a result, techniques are desired which provide power savings and/or improved performance in such wireless UE devices.

New and improved cellular radio access technologies (RATs) are sometimes deployed in addition to existing RATs. For example, networks implementing Long Term Evolution (LTE) technology, developed and standardized by the Third Generation Partnership Project (3GPP), are currently being deployed. LTE and other newer RATs often support faster data rates than networks utilizing legacy RATs, such as various second generation (2G) and third generation (3G) RATs.

However, in some deployments, LTE and other new RATs may not fully support some services that can be handled by legacy networks. Accordingly, LTE networks are often co-deployed in overlapping regions with legacy networks and UE devices may transition between RATs as services or coverage may require. For example, in some deployments, LTE networks are not capable of supporting voice calls. Thus, for example when a UE device receives or initiates a circuit switched voice call while connected to an LTE network that does not support voice calls, the UE device can transition to a legacy network, such as one which uses a GSM (Global System for Mobile Communications) RAT or a "1X" (Code Division Multiple Access 2000 (CDMA2000) 1X) RAT that supports voice calls, among other possibilities.

Some UE devices use a single radio to support operation on multiple cellular RATs. For example, some UE devices use a single radio to support operation on both LTE and GSM networks. The use of a single radio for multiple RATs makes transitioning between networks, such as in response to a page message for an incoming voice call or circuit switched service, more complex. In addition, the use of a single radio for multiple RATs presents certain power usage and performance issues.

For example, in such systems the UE may periodically tune from the first network, using a more advanced RAT, to the second network, using a legacy RAT, e.g., to listen to a paging channel for a voice call. However, such tune-away operations from a more advanced RAT, such as LTE, to a legacy RAT, such as GSM, can result in increased power consumption and/or performance degradation of the LTE network.

Therefore, it would be desirable to provide improved performance and power consumption in wireless communication systems where a UE devices use a single radio to support operation on multiple cellular RATs.

SUMMARY OF THE INVENTION

Embodiments described herein relate to a User Equipment (UE) device and associated method for operating a user equipment (UE) that includes a first radio that is configured to operate according to a first radio access technology (RAT) and a second RAT. The UE may receive a request to perform a tune away operation for the second RAT while performing measurement for the first RAT (e.g., intra-cell measurement, inter-cell measurement, and/or inter-RAT measurement). Instead of waiting to complete the measurement of the first RAT, the UE may tune the radio to a frequency of the second RAT to perform the tune away operation (e.g., page decoding) for the second RAT. After completing the tune away operation of the second RAT, the UE may tune the radio back to a frequency corresponding to the first RAT in order to continue the measurement operations of the first RAT.

Embodiments described herein relate to a User Equipment (UE) device and associated method for performing a tune away operation for a second RAT while performing warm up operations for a first RAT. For example, while the UE is waking up from a sleep mode to perform communication using the first RAT, it may perform various actions, such as warming up a crystal oscillator, performing start-up operations for one or more processors, and/or performing time tracking loop and/or frequency tracking loop (TTL/FTL) operations to synchronize operations with a base station of the first RAT. However, a tune away request may be received during this waking up process. If the tune away request is received prior to the TTL/FTL operations, then it may be performed just prior to the TTL/FTL operations. After the tune away procedure for the second RAT completes, the TTL/FTL operations of the first RAT may be performed. If the tune away request is received during the TTL/FTL operations, then they may be cancelled in order to perform the tune away operation for the second RAT. After completion, the TTL/FTL operations may be performed for the first RAT.

This Summary is provided for purposes of summarizing some exemplary embodiments to provide a basic understanding of aspects of the subject matter described herein. Accordingly, the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention can be obtained when the following detailed description of the embodiments is considered in conjunction with the following drawings.

Figure 1:
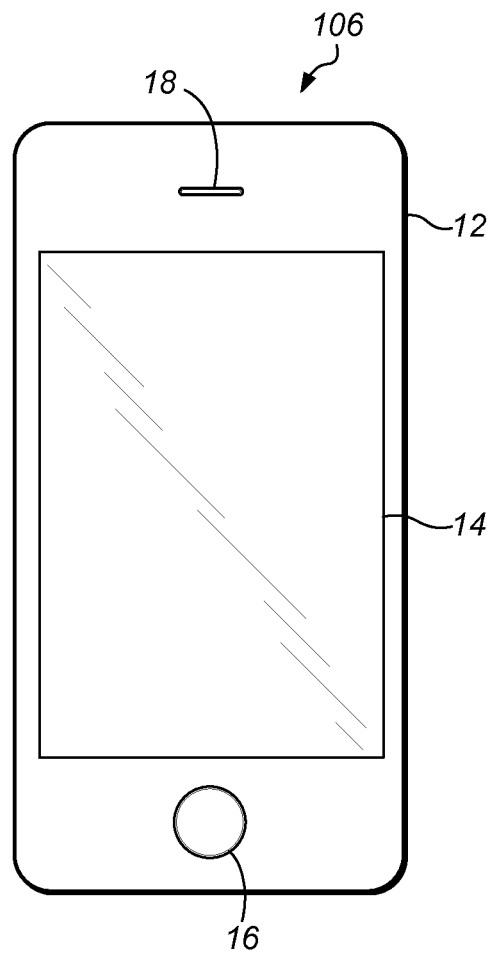
FIG. 1 illustrates an example user equipment (UE) according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present disclosure.
3GPP: Third Generation Partnership Project
3GPP2: Third Generation Partnership Project 2
GSM: Global System for Mobile Communications
UMTS: Universal Mobile Telecommunications System
LTE: Long Term Evolution
RAT: Radio Access Technology
TX: Transmit
RX: Receive

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a nonvolatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—User Equipment

FIG. 1 illustrates an example user equipment (UE) 106 according to one embodiment. The term UE 106 may be any of various devices as defined above. UE device 106 may include a housing 12 which may be constructed from any of various materials. UE 106 may have a display 14, which may be a touch screen that incorporates capacitive touch electrodes. Display 14 may be based on any of various display technologies. The housing 12 of the UE 106 may contain or comprise openings for any of various elements, such as home button 16, speaker port 18, and other elements (not shown), such as microphone, data port, and possibly various other types of buttons, e.g., volume buttons, ringer button, etc.

The UE 106 may support multiple radio access technologies (RATs). For example, UE 106 may be configured to communicate using any of various RATs such as two or more of Global System for Mobile Communications (GSM), Universal Mobile Telecommunications System (UMTS), Code Division Multiple Access (CDMA) (e.g., CDMA2000 1XRTT or other CDMA radio access technologies), Long Term Evolution (LTE), Advanced LTE, and/or other RATs. For example, the UE 106 may support at least two radio access technologies such as LTE and GSM. Various different or other RATs may be supported as desired.

The UE 106 may comprise one or more antennas. The UE 106 may also comprise any of various radio configurations, such as various combinations of one or more transmitter chains (TX chains) and one or more receiver chains (RX chains). For example, the UE 106 may comprise a radio that supports two or more RATs. The radio may comprise a single TX (transmit) chain and a single RX (receive) chain. Alternatively, the radio may comprise a single TX chain and two RX chains, e.g., that operate on the same frequency. In another embodiment, the UE 106 comprises two or more radios, i.e., two or more TX/RX chains (two or more TX chains and two or more RX chains).

In the embodiment described herein, the UE 106 comprises two antennas which communicate using two or more RATs. For example, the UE 106 may have a pair of cellular telephone antennas coupled to a single radio or shared radio. The antennas may be coupled to the shared radio (shared wireless communication circuitry) using switching circuits and other radio-frequency front-end circuitry. For example, the UE 106 may have a first antenna that is coupled to a transceiver or radio, i.e., a first antenna that is coupled to a transmitter chain (TX chain) for transmission and which is coupled to a first receiver chain (RX chain) for receiving. The UE 106 may also comprise a second antenna that is coupled to a second RX chain. The first and second receiver chains may share a common local oscillator, which means that both of the first and second receiver chains tune to the same frequency. The first and second receiver chains may be referred to as the primary receiver chain (PRX) and the diversity receiver chain (DRX).

In one embodiment, the PRX and DRX receiver chains operate as a pair and time multiplex among two or more RATs, such as LTE and one or more other RATs such as GSM or CDMA1x. In the primary embodiment described herein the UE 106 comprises one transmitter chain and two receiver chains (PRX and DRX), wherein the transmitter chain and the two receiver chains (acting as a pair) time multiplex between two (or more) RATs, such as LTE and GSM.

Each antenna may receive a wide range of frequencies such as from 600 MHz up to 3 GHz. Thus, for example, the local oscillator of the PRX and DRX receiver chains may tune to a specific frequency such as an LTE frequency band, where the PRX receiver chain receives samples from antenna 1 and the DRX receiver chain receives samples from antenna 2, both on the same frequency (since they use the same local oscillator). The wireless circuitry in the UE 106 can be configured in real time depending on the desired mode of operation for the UE 106. In the example embodiment described herein, the UE 106 is configured to support LTE and GSM radio access technologies.

Figure 2:
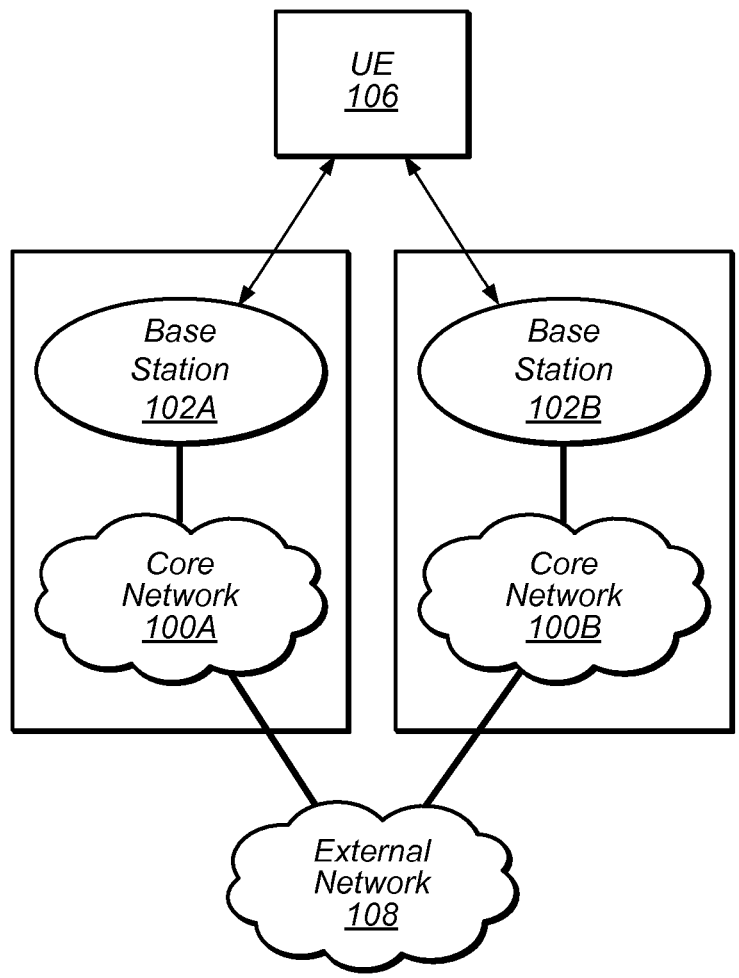
FIG. 2 illustrates an example wireless communication system where a UE communicates with two base stations using two different RATs.

FIG. 2—Communication System

FIG. 2 illustrates an exemplary (and simplified) wireless communication system. It is noted that the system of FIG. 2 is merely one example of a possible system, and embodiments may be implemented in any of various systems, as desired.

As shown, the exemplary wireless communication system includes base stations 102A and 102B which communicate over a transmission medium with one or more user equipment (UE) devices, represented as UE 106. The base stations 102 may be base transceiver stations (BTS) or cell sites, and may include hardware that enables wireless communication with the UE 106. Each base station 102 may also be equipped to communicate with a core network 100. For example, base station 102A may be coupled to core network 100A, while base station 102B may be coupled to core network 100B. Each core network may be operated by a respective cellular service provider, or the plurality of core networks 100A may be operated by the same cellular service provider. Each core network 100 may also be coupled to one or more external networks (such as external network 108), which may include the Internet, a Public Switched Telephone Network (PSTN), and/or any other network. Thus, the base stations 102 may facilitate communication between the UE devices 106 and/or between the UE devices 106 and the networks 100A, 100B, and 108.

The base stations 102 and the UEs 106 may be configured to communicate over the transmission medium using any of various radio access technologies ("RATs", also referred to as wireless communication technologies or telecommunication standards), such as GSM, UMTS (WCDMA), LTE, LTE Advanced (LTE-A), 3GPP2 CDMA2000 (e.g., 1xRTT, 1xEV-DO, HRPD, eHRPD), IEEE 802.11 (WLAN or Wi-Fi), IEEE 802.16 (WiMAX), etc.

Base station 102A and core network 100A may operate according to a first RAT (e.g., LTE) while base station 102B and core network 100B may operate according to a second (e.g., different) RAT (e.g., GSM, CDMA 2000 or other legacy or circuit switched technologies). The two networks may be controlled by the same network operator (e.g., cellular service provider or "carrier"), or by different network operators, as desired. In addition, the two networks may be operated independently of one another (e.g., if they operate according to different RATs), or may be operated in a somewhat coupled or tightly coupled manner.

Note also that while two different networks may be used to support two different RATs, such as illustrated in the exemplary network configuration shown in FIG. 2, other network configurations implementing multiple RATs are also possible. As one example, base stations 102A and 102B might operate according to different RATs but couple to the same core network. As another example, multi-mode base stations capable of simultaneously supporting different RATs (e.g., LTE and GSM, LTE and CDMA2000 1xRTT, and/or any other combination of RATs) might be coupled to a core network that also supports the different cellular communication technologies. In one embodiment, the UE 106 may be configured to use a first RAT that is a packet-switched technology (e.g., LTE) and a second RAT that is a circuit-switched technology (e.g., GSM or 1xRTT).

As discussed above, UE 106 may be capable of communicating using multiple RATs, such as those within 3GPP, 3GPP2, or any desired cellular standards. The UE 106 might also be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of network communication standards are also possible.

Base stations 102A and 102B and other base stations operating according to the same or different RATs or cellular communication standards may thus be provided as a network of cells, which may provide continuous or nearly continuous overlapping service to UE 106 and similar devices over a wide geographic area via one or more radio access technologies (RATs).

Figure 3:
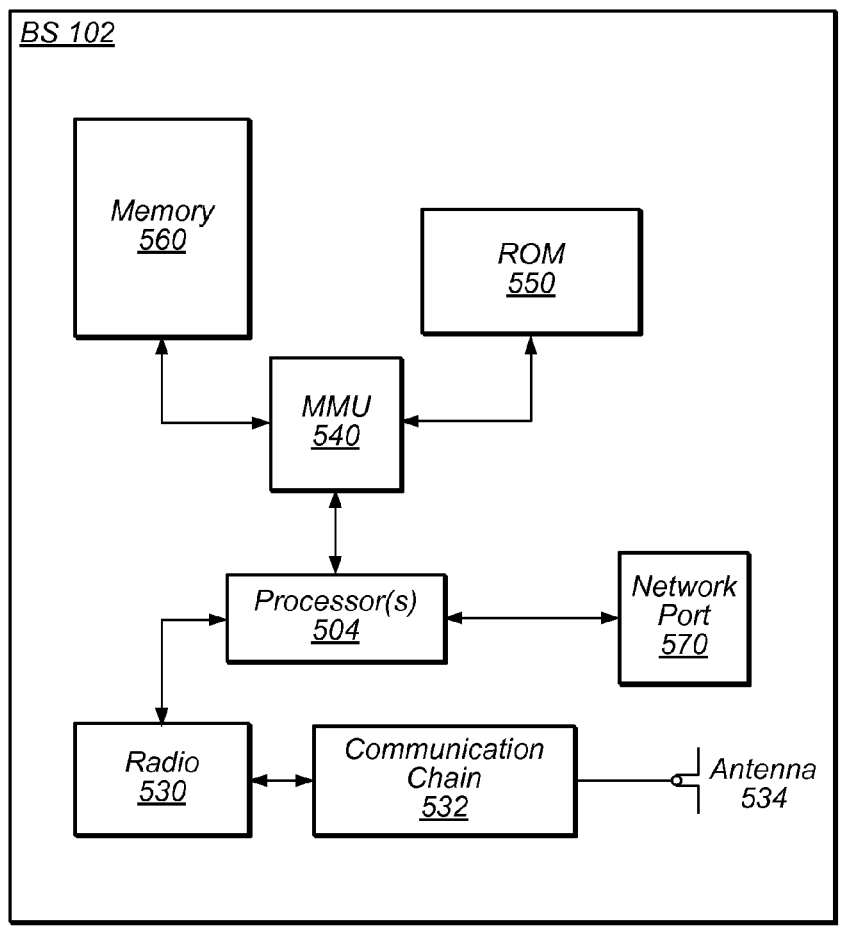
FIG. 3 is an example block diagram of a base station, according to one embodiment.

FIG. 3—Base Station

FIG. 3 illustrates an exemplary block diagram of a base station 102. It is noted that the base station of FIG. 3 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/ or other services to a plurality of devices, such as UE devices 106. In some cases, the network port 570 may couple to a telephone network via the core network, and/or the core network may provide a telephone network (e.g., among other UE devices 106 serviced by the cellular service provider).

The base station 102 may include at least one antenna 534. The at least one antenna 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various RATs, including, but not limited to, LTE, GSM, WCDMA, CDMA2000, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Figure 4:
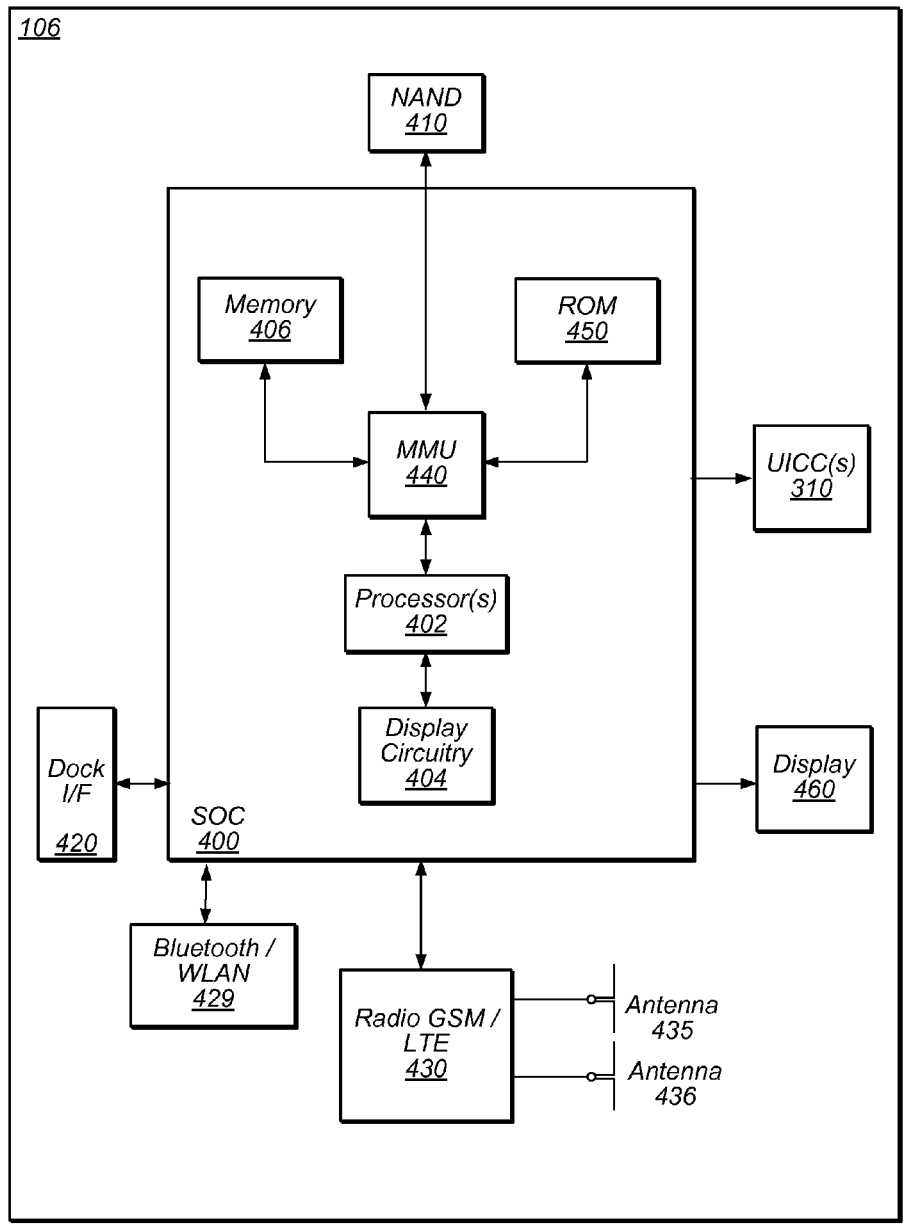
FIG. 4 is an example block diagram of a UE, according to one embodiment.

FIG. 4—User Equipment (UE)

FIG. 4 illustrates an example simplified block diagram of a UE 106. As shown, the UE 106 may include a system on chip (SOC) 400, which may include portions for various purposes. The SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, cellular communication circuitry 430 such as for LTE, GSM, etc., and short range wireless communication circuitry 429 (e.g., Bluetooth and WLAN circuitry). The UE 106 may further comprise one or more smart cards 310 that comprise SIM (Subscriber Identity Module) functionality, such as one or more UICC(s) (Universal Integrated Circuit Card(s)) cards 310. The cellular communication circuitry 430 may couple to one or more antennas, preferably two antennas 435 and 436 as shown. The short range wireless communication circuitry 429 may also couple to one or both of the antennas 435 and 436 (this connectivity is not shown for ease of illustration).

As shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, cellular communication circuitry 430, short range wireless communication circuitry 429, connector I/F 420, and/or display 460. The MMU 440 may be configured to perform memory protection and page table translation or set up. In some embodiments, the MMU 440 may be included as a portion of the processor(s) 402.

In one embodiment, as noted above, the UE 106 comprises at least one smart card 310, such as a UICC 310, which executes one or more Subscriber Identity Module (SIM) applications and/or otherwise implement SIM functionality. The at least one smart card 310 may be only a single smart card 310, or the UE 106 may comprise two or more smart cards 310. Each smart card 310 may be embedded, e.g., may be soldered onto a circuit board in the UE 106, or each smart card 310 may be implemented as a removable smart card. Thus the smart card(s) 310 may be one or more removable smart cards (such as UICC cards, which are sometimes referred to as "SIM cards"), and/or the smart card(s) 310 may be one or more embedded cards (such as embedded UICCs (eUICCs), which are sometimes referred to as "eSIMs" or "eSIM cards"). In some embodiments (such as when the smart card(s) 310 include an eUICC), one or more of the smart card(s) 310 may implement embedded SIM (eSIM) functionality; in such an embodiment, a single one of the smart card(s) 310 may execute multiple SIM applications. Each of the smart card(s) 310 may include components such as a processor and a memory; instructions for performing SIM/eSIM functionality may be stored in the memory and executed by the processor. In one embodiment, the UE 106 may comprise a combination of removable smart cards and fixed/non-removable smart cards (such as one or more eUICC cards that implement eSIM functionality), as desired. For example, the UE 106 may comprise two embedded smart cards 310, two removable smart cards 310, or a combination of one embedded smart card 310 and one removable smart card 310. Various other SIM configurations are also contemplated.

As noted above, in one embodiment, the UE 106 comprises two or more smart cards 310, each implementing SIM functionality. The inclusion of two or more SIM smart cards 310 in the UE 106 may allow the UE 106 to support two different telephone numbers and may allow the UE 106 to communicate on corresponding two or more respective networks. For example, a first smart card 310 may comprise SIM functionality to support a first RAT such as LTE, and a second smart card 310 may comprise SIM functionality to support a second RAT such as GSM. Other implementations and RATs are of course possible. Where the UE 106 comprises two smart cards 310, the UE 106 may support Dual SIM Dual Active (DSDA) functionality. The DSDA functionality may allow the UE 106 to be simultaneously connected to two networks (and use two different RATs) at the same time. The DSDA functionality may also allow the UE 106 may to simultaneously receive voice calls or data traffic on either phone number. In another embodiment, the UE 106 supports Dual SIM Dual Standby (DSDS) functionality. The DSDS functionality may allow either of the two smart cards 310 in the UE 106 to be on standby waiting for a voice call and/or data connection. In DSDS, when a call/data is established on one SIM 310, the other SIM 310 is no longer active. In one embodiment, DSDx functionality (either DSDA or DSDS functionality) may be implemented with a single smart card (e.g., a eUICC) that executes multiple SIM applications for different carriers and/or RATs.

As noted above, the UE 106 may be configured to communicate wirelessly using multiple radio access technologies (RATs). As further noted above, in such instances, the cellular communication circuitry (radio(s)) 430 may include radio components which are shared between multiple RATS and/or radio components which are configured exclusively for use according to a single RAT. Where the UE 106 comprises at least two antennas, the antennas 435 and 436 may be configurable for implementing MIMO (multiple input multiple output) communication.

As described herein, the UE 106 may include hardware and software components for implementing features for communicating using two or more RATs, such as those described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5A:
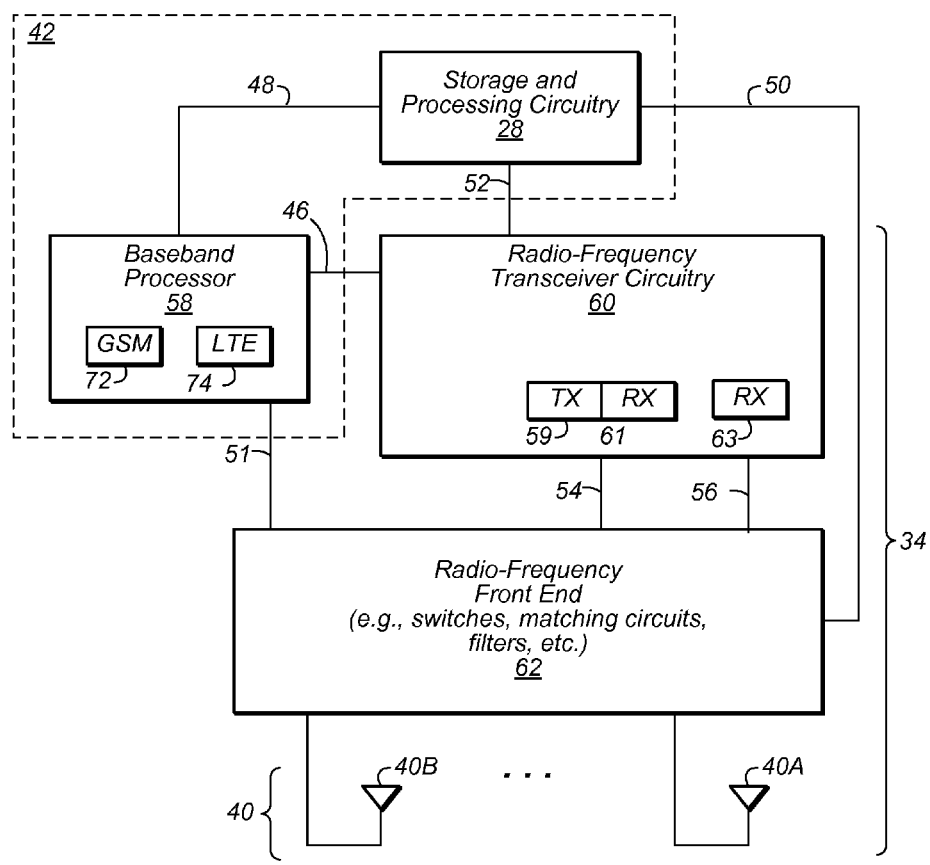
FIGS. 5A and 5B are example block diagrams of wireless communication circuitry in the UE, according to one embodiment.
Figure 5B:
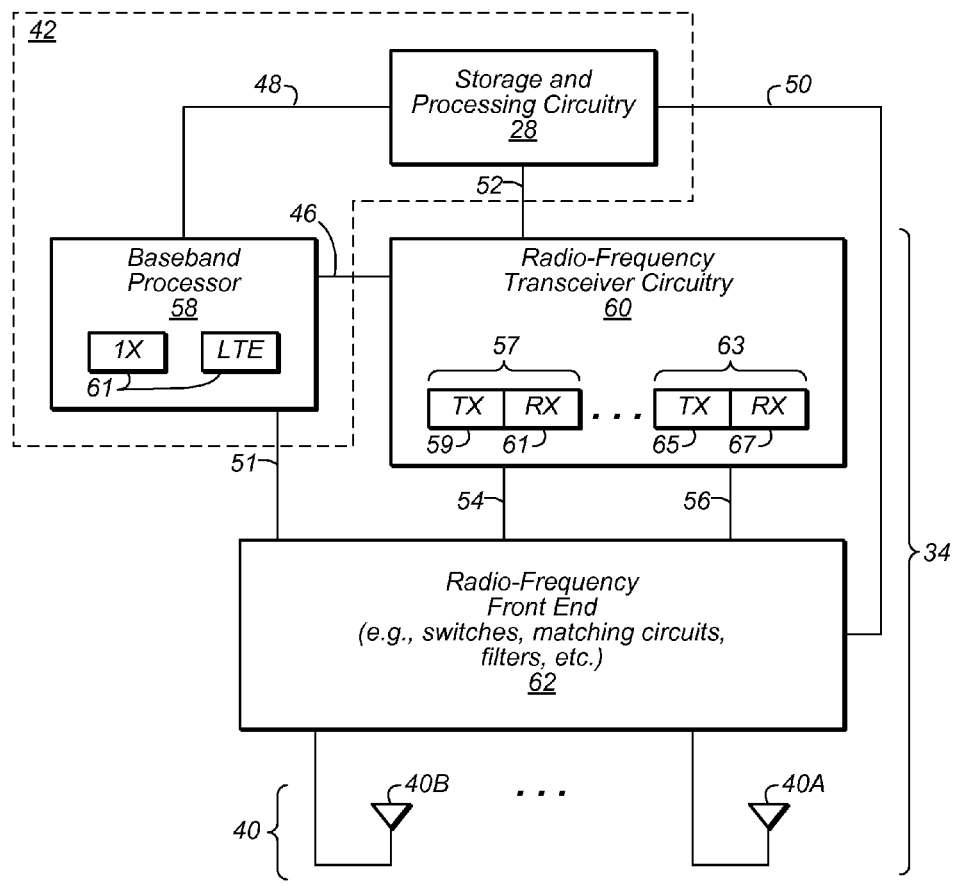

FIGS. 5A and 5B—UE Transmit/Receive Logic

FIG. 5A illustrates a portion of UE 106 according to one embodiment. As shown, UE 106 may comprise control circuitry 42 that is configured to store and execute control code for implementing control algorithms in the UE 106. Control circuitry 42 may include storage and processing circuitry 28 (e.g., a microprocessor, memory circuits, etc.) and may include baseband processor integrated circuit 58. Baseband processor 58 may form part of wireless circuitry 34 and may include memory and processing circuits (i.e., baseband processor 58 may be considered to form part of the storage and processing circuitry of UE 106). Baseband processor 58 may comprise software and/or logic for handling various different RATs, such as GSM logic 72 and LTE logic 74, among others.

Baseband processor 58 may provide data to storage and processing circuitry 28 (e.g., a microprocessor, nonvolatile memory, volatile memory, other control circuits, etc.) via path 48. The data on path 48 may include raw and processed data associated with UE cellular communications and operations, such as cellular communication data, wireless (antenna) performance metrics for received signals, information related to tune-away operations, information related to paging operations, etc. This information may be analyzed by storage and processing circuitry 28 and/or processor 58 and, in response, storage and processing circuitry 28 (or, if desired, baseband processor 58) may issue control commands for controlling wireless circuitry 34. For example, storage and processing circuitry 28 may issue control commands on path 52 and path 50 and/or baseband processor 58 may issue commands on path 46 and path 51.

Wireless circuitry 34 may include radio-frequency transceiver circuitry such as radio-frequency transceiver circuitry 60 and radio-frequency front-end circuitry 62. Radio-frequency transceiver circuitry 60 may include one or more radio-frequency transceivers. In the embodiment shown radio-frequency transceiver circuitry 60 comprises transceiver (TX) chain 59, receiver (RX) chain 61 and RX chain 63. As noted above, the two RX chains 61 and 63 may be a primary RX chain 61 and a diversity RX chain 63. The two RX chains 61 and 63 may be connected to the same local oscillator (LO) and thus may operate together at the same frequency for MIMO operations. Thus the TX chain 59 and the two RX chains 61 and 63 may be considered, along with other necessary circuitry, as a single radio. Other embodiments are of course contemplated. For example, the radio-frequency transceiver circuitry 60 may comprise only a single TX chain and only a single RX chain, also a single radio embodiment. Thus the term "radio" may be defined to have the broadest scope of its ordinary and accepted meaning, and comprises the circuitry normally found in a radio, including either a single TX chain and a single RX chain or a single TX chain and two (or more) RX chains, e.g., connected to the same LO. The term radio may encompass the transmit and receive chains discussed above and may also include digital signal processing coupled to the radio frequency circuitry (e.g., the transmit and receive chains) associated with performing wireless communication. As one example, the transmit chain may include such components as amplifier, mixer, filter, and digital analog converter. Similarly, the receive chain(s) may include, e.g., such components as amplifier, mixer, filter, and analog to digital converter. As mentioned above, multiple receive chains may share a LO, although in other embodiments, they may comprise their own LO. Wireless communication circuitry may encompass a larger set of components, e.g., including one or more radios of the UE (transmit/receive chains and/or digital signal processing), baseband processors, etc. The term "cellular wireless communication circuitry" includes various circuitry for performing cellular communication, e.g., as opposed to other protocols that are not cellular in nature, such as Bluetooth. Certain embodiments of the invention described herein may operate to improve performance when a single radio (i.e., a radio with a single TX chain and single RX chain; or a radio with a single TX chain and two RX chains, where the two RX chains are connected to the same LO) supports multiple RATs.

As shown in FIG. 5B, the radio-frequency transceiver circuitry 60 may also comprise two or more TX chains and two or more RX chains. For example, FIG. 5B shows an embodiment with a first radio 57 comprising TX chain 59 and RX chain 61 and a second radio 63 comprising a first TX chain 65 and a second TX chain 67. Embodiments are also contemplated where additional TX/RX receive chains may be included in the embodiment of FIG. 5A, i.e., in addition to the one TX chain 59 and two RX chains 61 and 63 shown. In these embodiments that have multiple TX and RX chains, when only one radio is currently active, e.g., the second radio is turned off to save power, certain embodiments of the invention described herein may operate to improve performance of the single active radio when it supports multiple RATs.

Baseband processor 58 may receive digital data that is to be transmitted from storage and processing circuitry 28 and may use path 46 and radio-frequency transceiver circuitry 60 to transmit corresponding radio-frequency signals. Radio-frequency front end 62 may be coupled between radio-frequency transceiver 60 and antennas 40 and may be used to convey the radio-frequency signals that are produced by radio-frequency transceiver circuitry 60 to antennas 40. Radio-frequency front end 62 may include radio-frequency switches, impedance matching circuits, filters, and other circuitry for forming an interface between antennas 40 and radio-frequency transceiver 60.

Incoming radio-frequency signals that are received by antennas 40 may be provided to baseband processor 58 via radio-frequency front end 62, paths such as paths 54 and 56, receiver circuitry in radio-frequency transceiver 60, and paths such as path 46. Path 54 may, for example, be used in handling signals associated with transceiver 57, whereas path 56 may be used in handling signals associated with transceiver 63. Baseband processor 58 may convert received signals into digital data that is provided to storage and processing circuitry 28. Baseband processor 58 may also extract information from received signals that is indicative of signal quality for the channel to which the transceiver is currently tuned. For example, baseband processor 58 and/or other circuitry in control circuitry 42 may analyze received signals to produce various measurements, such as bit error rate measurements, measurements on the amount of power associated with incoming wireless signals, strength indicator (RSSI) information, received signal code power (RSCP) information, reference symbol received power (RSRP) information, signal-to-interference ratio (SINR) information, signal-to-noise ratio (SNR) information, channel quality measurements based on signal quality data such as Ec/Io or Ec/No data, etc.

Radio-frequency front end 62 may include switching circuitry. The switching circuitry may be configured by control signals received from control circuitry 42 (e.g., control signals from storage and processing circuitry 28 via path 50 and/or control signals from baseband processor 58 via path 51). The switching circuitry may include a switch (switch circuit) that is used to connect TX and RX chain(s) to antennas 40A and 40B. Radio-frequency transceiver circuitry 60 may be configured by control signals received from storage and processing circuitry over path 52 and/or control signals received from baseband processor 58 over path 46.

The number of antennas that are used may depend on the operating mode for UE 106. For example, as shown in FIG. 5A, in normal LTE operations, antennas 40A and 40B may be used with respective receivers 61 and 63 to implement a receive diversity scheme, such as for MIMO operations. With this type of arrangement, two LTE data streams may be simultaneously received and processed using baseband processor 58. When it is desired to monitor a GSM paging channel for incoming GSM pages, one or both of the antennas may be temporarily used in receiving GSM paging channel signals.

Control circuitry 42 may be used to execute software for handling more than one radio access technology. For example, baseband processor 58 may include memory and control circuitry for implementing multiple protocol stacks such as a GSM protocol stack 72 and an LTE protocol stack 74. Thus, protocol stack 72 may be associated with a first radio access technology such as GSM (as an example), and protocol stack 74 may be associated with a second radio access technology such as LTE (as an example). During operation, UE 106 may use GSM protocol stack 72 to handle GSM functions and may use LTE protocol stack 74 to handle LTE functions. Additional protocol stacks, additional transceivers, additional antennas 40, and other additional hardware and/or software may be used in UE 106 if desired. The arrangement of FIGS. 5A and 5B is merely illustrative. In one embodiment, one or both of the protocol stacks may be configured to implement the methods described in the flowcharts below.

In one embodiment of FIG. 5A (or 5B), the cost and complexity of UE 106 may be minimized by implementing the wireless circuitry of FIG. 5A (or 5B) using an arrangement in which baseband processor 58 and radio-transceiver circuitry 60 are used to support both LTE and GSM traffic.

The GSM radio access technology may generally be used to carry voice traffic, whereas the LTE radio access technology may generally be used to carry data traffic. To ensure that GSM voice calls are not interrupted due to LTE data traffic, GSM operations may take priority over LTE operations. To ensure that operations such as monitoring a GSM paging channel for incoming paging signals do not unnecessarily disrupt LTE operations, control circuitry 42 can, whenever possible, configure the wireless circuitry of UE 106 so that wireless resources are shared between LTE and GSM functions.

When a user has an incoming GSM call, the GSM network may send UE 106 a paging signal (sometimes referred to as a page) on the GSM paging channel using base station 102. When UE 106 detects an incoming page, UE 106 can take suitable actions (e.g., call establishment procedures) to set up and receive the incoming GSM call. Pages are typically sent several times at fixed intervals by the network, so that devices such as UE 106 will have multiple opportunities to successfully receive a page.

Proper GSM page reception may require that the wireless circuitry of UE 106 be periodically tuned to the GSM paging channel, referred to as a tune-away operation. If the transceiver circuitry 60 fails to tune to the GSM paging channel or if the GSM protocol stack 72 in baseband processor 58 fails to monitor the paging channel for incoming pages, GSM pages will be missed. On the other hand, excessive monitoring of the GSM paging channel may have an adverse impact on an active LTE data session. Embodiments of the invention may comprise improved methods for handling tune-away operations, as described below.

In some embodiments, in order for the UE 106 to conserve power, the GSM and LTE protocol stacks 72 and 74 may support idle mode operations. Also, one or both of the protocol stacks 72 and 74 may support a discontinuous reception (DRX) mode and/or a connected discontinuous reception (CDRX) mode. DRX mode refers to a mode which powers down at least a portion of UE circuitry when there is no data (or voice) to be received. In DRX and CRDX modes, the UE 106 synchronizes with the base station 102 and wakes up at specified times or intervals to listen to the network. DRX is present in several wireless standards such as UMTS, LTE (Long-term evolution), WiMAX, etc. The terms "idle mode", "DRX" and "CDRX" are explicitly intended to at least include the full extent of their ordinary meaning, and are intended to encompass similar types of modes in future standards.

Resolving Conflict Between Measurement of a First RAT and Paging of a Second RAT As discussed above, a UE may use a single radio (e.g., having a single transmit chain and a single receive chain) to communicate using two different RATs. For example, the UE may use a single radio to communicate using a first RAT and may periodically tune away in order to perform various actions for a second RAT, such as page decoding, measurement, synchronization, etc. Note that the radio may be the single cellular radio for the UE or may be one of a plurality of cellular radios. In a multiple radio embodiment, and one of the cellular radios may be used for time-sharing of the first RAT and the second RAT, e.g., while the other cellular radio is disabled, such as for power consumption reasons, or is used for other purposes. Additionally, the UE may implement dual SIM dual active (DSDA) and/or dual SIM dual standby (DSDS), as desired.

In one embodiment, the first RAT may be LTE and the second RAT may be GSM or the first RAT may be GSM and the second RAT may be LTE, although other combinations of RATs are envisioned. In some cases, it may be typical to tune away periodically in order to perform various operations, such as for page decoding and/or synchronization for the second RAT (e.g., for neighboring base stations of the current base station of the second RAT). In the following, the first RAT may be described as LTE and the second RAT may be described as GSM, but any of these descriptions may apply to other RATs, as desired.

In comparison to CDMA 2000 1x, SRLTE for GSM may have significant differences. For example, GSM tune-away (e.g., for page decoding) may be 10 times more frequent (e.g., at least once per 470 ms) than 1x tune-way which is generally once per 5.21 s. Additionally, in most cases, the duration of each GSM tune-away may be very short, e.g., 10-20 milliseconds, while in most cases duration of 1x tune-away may be 90-100 milliseconds.

Due to the nature of frequent GSM tune-aways, the possibility of tune-away requests occurring during an un-interruptible LTE operation may be high. For example, in LTE connected mode, a measurement gap may be 6 ms long and may be used for searching/measuring inter-frequency LTE cells and inter-RAT cells, among other possibilities. In some cases, it takes about 15-21 ms to complete an entire measurement gap operation, e.g., including gap setup time (e.g., for preparing radio frequency script for the frequency to be tuned and tune-back from and to the current frequency, and actual radio frequency configuration and radio frequency tuning), collection of radio frequency samples, and radio frequency configuration and radio frequency tune-back. In some cases, if a GSM tune-away request happens during these measurement gap operations, the GSM tune away may be delayed until measurement gap operations finish. However, since GSM page detection is only 10 ms, such a delay would typically lead to missing a GSM page.

Accordingly, to speed up the response time to the GSM tune-away request, and also to minimize impact on LTE performance, one or more of the following embodiments may be implemented.

For example, if a GSM tune-away request occurs prior to the start of the LTE measurement gap, GSM tune-away may take higher priority, and the same measurement gap may be used for performing the GSM tune-way. In one embodiment, this process may involve preparing a radio frequency script for tune-away to a frequency associated with GSM, and for tuning back from that GSM frequency. Accordingly, at the time of the GSM page, the radio frequency circuitry may be tuned to the GSM frequency and GSM samples may be collected, e.g., to perform page decoding. After, if there are inter-frequency and/or inter-RAT cells pending detection/measurement for the measurement gap (e.g., for LTE), then the radio frequency circuitry may be tuned directly to the frequency of inter-frequency LTE cells or inter-RAT cells and measurement for LTE may be performed. In this case, the radio may not tune to the normal, serving frequency (e.g., for data communications of LTE) and then to the measurement frequency, but instead may tune directly to the measurement frequency. After measurement, the radio may be tuned back to the serving frequency of LTE for normal operation.

In another case, the GSM tune-away request may occur during the measurement gap of LTE. In one embodiment, the GSM tune-away may be scheduled right after inter-frequency and/or inter-RAT sample collection is complete. In particular, instead of tuning back to the LTE serving frequency, the radio may be directly tuned to the GSM frequency, e.g., to collect GSM page frame samples. After collecting enough GSM samples, the radio may be tuned back to the LTE serving frequency, e.g., as normal measurement gap completion.

Thus, in one embodiment, for scenarios of LTE measurement gap collision with GSM tune-way (e.g., for paging), the GSM tune away may be inserted before or after tuning to the inter frequency and/or inter-RAT frequency as part of measurement gap. As a result, interruption to LTE normal reception and transmission may be minimized because the network normally schedules less grant/MCS around the measurement gap and accordingly, GSM tune-way around this measurement gap may result in less impact on LTE throughput performance. Additionally, a normal schedule of inter-frequency and/or inter-RAT cell detection and measurement may be maintained. As an additional benefit, GSM tune-away may occur back to back with measurement gap which may eliminate an extra radio frequency circuitry tuning overhead.

Figure 6:
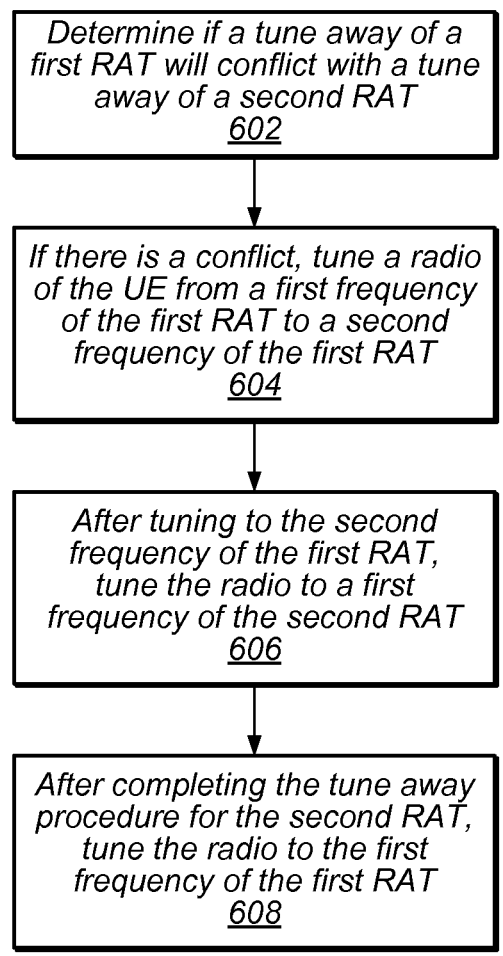
FIG. 6 is a flowchart diagram illustrating an exemplary method for resolving conflict between tune aways of a first and second RAT.

FIG. 6—Resolving Conflict between Tune Aways of a First and Second RAT

FIG. 6 is a flowchart diagram illustrating a method for resolving conflicts between tune aways for a first RAT and a second RAT. The method may be performed by a UE device (such as UE 106) that uses a first radio for both a first RAT and a second RAT (e.g., LTE and GSM, although other combinations of RATs are envisioned). The method shown in FIG. 6 may be used in conjunction with any of the systems or devices shown in the above Figures, among other devices. In various embodiments, some of the method elements shown may be performed concurrently, in a different order than shown, or may be omitted. Note also that additional method elements may also be performed as desired. The method may be performed as follows.

As shown, in 602, the UE may determine if a tune away of a first RAT (e.g., for measurement, such as inter-cell measurement, inter-RAT measurement, and/or other measurements) will conflict with a tune away of a second RAT (e.g., for page decoding). The determination of this conflict may occur prior to either of the tune aways, or after one has been started, depending on the situation. For example, in an embodiment that may be particularly applicable to FIG. 6, this determination may occur while the tune away for the first RAT has already started. For example, the UE may perform measurement (e.g., LTE measurement) for the first RAT and may need to perform a page decoding for the second RAT (e.g., page decoding for GSM) after this measurement process has started.

In 604, if the determination of 602 indicates a conflict, then the UE may tune the first radio from a first frequency of the first RAT (e.g., a serving frequency) to a second frequency of the first RAT (e.g., for performing measurement), e.g., instead of to a frequency of the second RAT to perform the tune away operations of the second RAT. In one embodiment, the UE may collect samples, e.g., from a serving base station or neighboring base station of the first RAT.

In 606, after tuning to the second frequency of the first RAT, e.g., for performing measurement associated with the first RAT, the first radio may be tuned to a first frequency of the second RAT for the tune away procedure of the second RAT (e.g., to perform page decoding associated with the second RAT). In one embodiment, the tuning to the first frequency of the second RAT from the second frequency of the first RAT may be performed directly, without tuning to any intermediate frequency, such as the first frequency of the first RAT.

In some embodiments, the UE may "pipeline" collection of samples and decoding of those samples. For example, if samples are collected in 604, e.g., for performing measurement of the first RAT, they may be decoded during 606 or 608 rather than completing the decoding before moving on to tuning to the frequency of the second RAT and performing the associated tune away procedure.

In 608, after completing the tune away procedure for the second RAT, the UE may tune the first radio back to the first RAT, e.g., to the first frequency (which may be the serving frequency) of the first RAT.

Figure 7A:
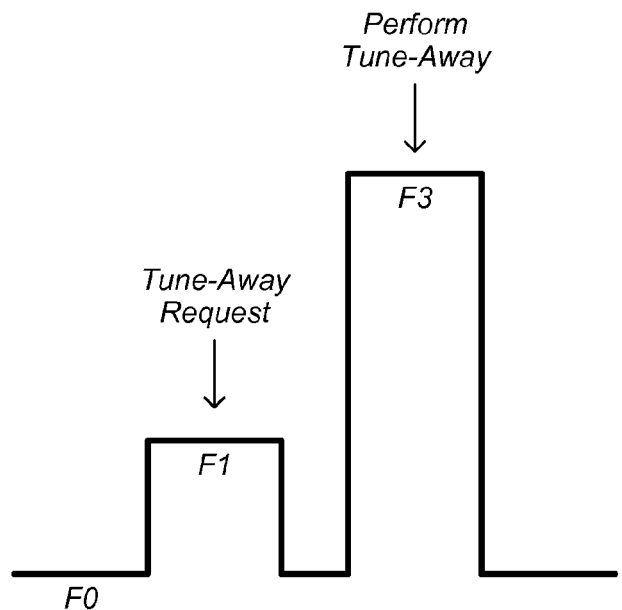
FIGS. 7A and 7B are diagrams corresponding to embodiments of the method of FIG. 6.
Figure 7B:
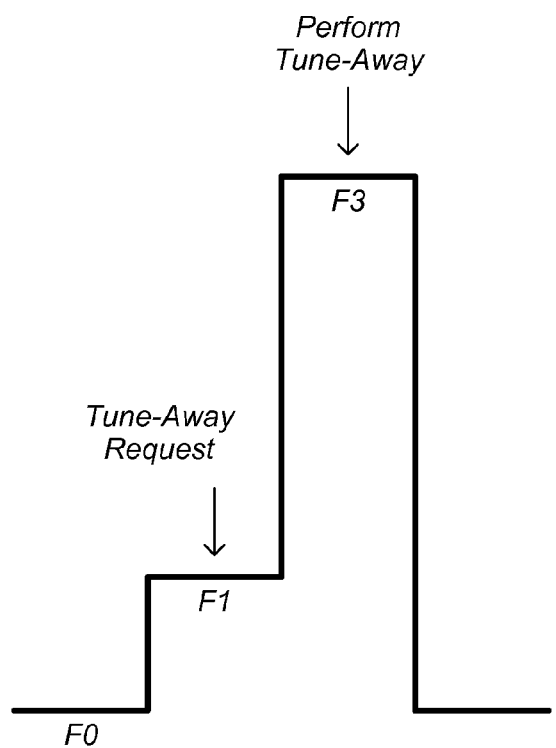

FIGS. 7A and 7B

FIGS. 7A and 7B illustrate an exemplary diagram corresponding to one embodiment of the method of FIG. 6. In particular, FIGS. 7A and 7B illustrate a case where the tune away request of the second RAT is received during a tune away operation of the first RAT. In particular, in FIG. 7A the UE has performs a tune away from for the first RAT from a first frequency (F0, e.g., the serving frequency of the first RAT) to a second frequency (F1, e.g., for inter-cell measurement of the first RAT). A tune away request for the second RAT (e.g., for page decoding) is received while the radio of the UE is tuned to the second frequency (F1). In FIG. 7A, the radio is tuned back to the first frequency of the first RAT (F0) and then tuned to the frequency of the second RAT for the tune away operation (F3). After completing the tune away operation, the radio is tuned back to F0.

In contrast, in FIG. 7B, instead of tuning back to F0 between the second frequency of the first RAT (F1) and the frequency of the second RAT (F3), the radio is tuned directly from the second frequency of the first RAT (F1) to the frequency of the second RAT (F3). As shown, in FIG. 7B, the tune away operation of the second RAT is able to be performed sooner than in FIG. 7A.

Figure 8:
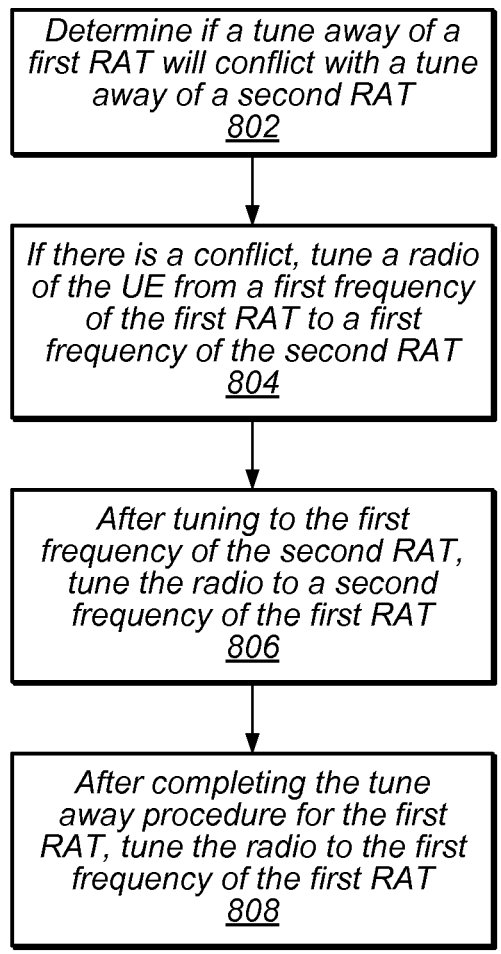
FIG. 8 is a flowchart diagram illustrating an exemplary method for resolving conflict between tune aways of a first and second RAT.

FIG. 8—Resolving Conflict Between Tune Aways of a First and Second RAT

FIG. 8 is a flowchart diagram illustrating a method for resolving conflicts between tune aways for a first RAT and a second RAT. The method may be performed by a UE device (such as UE 106) that uses a first radio for both a first RAT and a second RAT (e.g., LTE and GSM, although other combinations of RATs are envisioned). The method shown in FIG. 8 may be used in conjunction with any of the systems or devices shown in the above Figures, among other devices. In various embodiments, some of the method elements shown may be performed concurrently, in a different order than shown, or may be omitted. Note also that additional method elements may also be performed as desired. The method may be performed as follows.

As shown, in 802, the UE may determine if a tune away of a first RAT (e.g., for measurement, such as inter-cell measurement, inter-RAT measurement, and/or other measurements) will conflict with a tune away of a second RAT (e.g., for page decoding). The determination of this conflict may occur prior to either of the tune aways, or after one has been started. For example, in an embodiment that may be particularly applicable to FIG. 8, this determination may occur prior to the beginning of tune away for the first RAT. For example, the UE may receive a request to perform a tune away for the second RAT (e.g., for performing page decoding for GSM) prior to beginning a tune away for the first RAT (e.g., for performing LTE measurement).

In 804, if the determination of 802 indicates a conflict, then the UE may tune the first radio from a first frequency of the first RAT (e.g., a serving frequency) to a first frequency of the second RAT (e.g., for performing page decoding). In one embodiment, the UE may collect samples from the first frequency of the second RAT (e.g., to detect a page for the UE).

In 806, after tuning to the first frequency of the second RAT, e.g., for performing page decoding, the radio may be tuned to a second frequency of the first RAT for the tune away procedure of the first RAT (e.g., to perform LTE measurement). In one embodiment, the tuning to the second frequency of the first RAT from the first frequency of the second RAT may be performed directly, without tuning to any intermediate frequency, such as the first frequency of the first RAT.

In some embodiments, the UE may "pipeline" collection of samples and decoding of those samples. For example, if samples are collected in 604, e.g., for performing page decoding of the second RAT, they may be decoded (e.g., or used for detection of the paging) during 606 or 608 rather than completing the decoding or detection before moving on to tuning to the frequency of the first RAT and performing the associated tune away procedure.

In 808, after completing the tune away procedure for the first RAT, the UE may tune the first radio back to the first RAT, e.g., to the first frequency (which may be the serving frequency) of the first RAT.

Figure 9A:
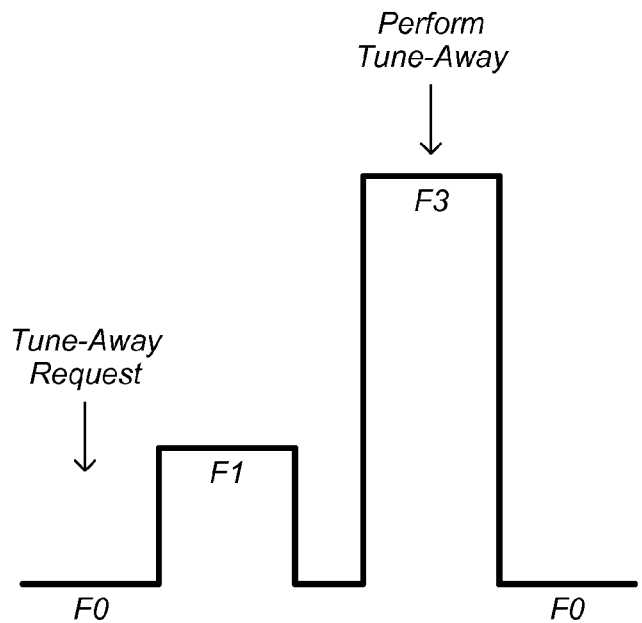
FIGS. 9A and 9B are diagrams corresponding to embodiments of the method of FIG. 8.
Figure 9B:
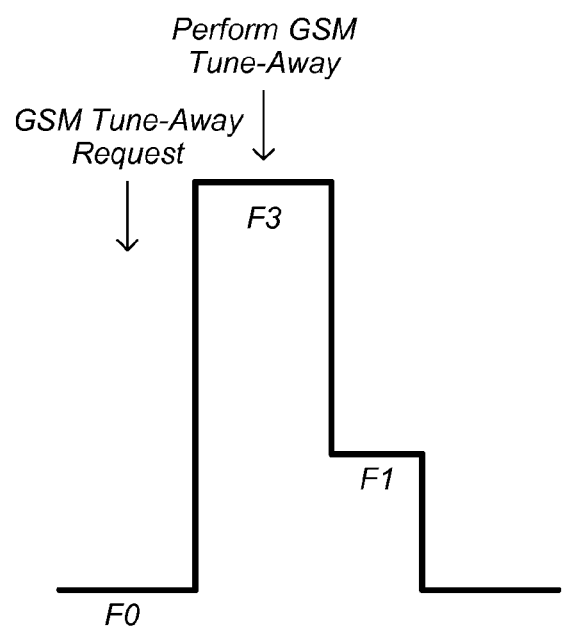

FIGS. 9A and 9B

FIGS. 9A and 9B illustrate an exemplary diagram corresponding to one embodiment of the method of FIG. 8. In particular, FIGS. 9A and 9B illustrate a case where the tune away request of the second RAT is received prior to a tune away operation of the first RAT. In particular, in FIG. 9A, the tune away for the second RAT is delayed. In particular, the UE performs a tune away from for the first RAT from a first frequency (F0, e.g., the serving frequency of the first RAT) to a second frequency (F1, e.g., for inter-cell measurement of the first RAT). Then, in FIG. 7A, the radio is tuned back to the first frequency of the first RAT (F0) and then tuned to the frequency of the second RAT for the tune away operation (F3). After completing the tune away operation, the radio is tuned back to F0.

In contrast, in FIG. 7B, instead of performing the tune away operation of the first RAT, the tune away operation of the second RAT is performed. In particular, the tune away request is received prior to tuning to F1 for the first RAT tune away operation. Accordingly, the tune away operation of the second RAT is performed first, where the radio is tuned from the first frequency of the first RAT (F0) to the frequency of the second RAT for the tune away operation (F3). Then, instead of tuning back to the first frequency of the first RAT, the radio is tuned directly to the second frequency of the first RAT (F2) to perform the tune away operation of the first RAT. After completion of the tune away operation of the first RAT, the radio is tuned back to the first frequency of the first RAT (F0).

Inserting Page Decoding of a Second RAT in Measurement for a First RAT

As discussed above, a UE may use a single radio (e.g., having a single transmit chain and a single receive chain) to communicate using two different RATs. For example, the UE may use a single radio to communicate using a first RAT and may periodically tune away in order to perform various actions for a second RAT, such as page decoding, measurement, synchronization, etc. Note that the radio may be the single cellular radio for the UE or may be one of a plurality of cellular radios. In a multiple radio embodiment, one of the cellular radios may be used for time-sharing of the first RAT and the second RAT, e.g., while the other radio sleeps or is used for other purposes. Additionally, the UE may implement dual SIM dual active (DSDA) and/or dual SIM dual standby (DSDS), as desired.

In one embodiment, the first RAT may be LTE and the second RAT may be GSM or the first RAT may be GSM and the second RAT may be LTE, although other combinations of RATs are envisioned. In some cases, it may be typical to tune away periodically in order to perform synchronization for the second RAT (e.g., for neighboring base stations of the current base station of the second RAT). In the following, the first RAT may be described as LTE and the second RAT may be described as GSM, but any of these descriptions may apply to other RATs, as desired.

In comparison to CDMA 2000 1x, SRLTE for GSM may have significant differences. For example, GSM tune-away (e.g., for page decoding) may be 10 times more frequent (e.g., at least once per 470 ms) than 1x tune-way which is once per 5.21 s. Additionally, in most cases, the duration of each GSM tune-away may be very short, e.g., 10-20 milliseconds, while in most cases duration of 1x tune-away may be 90-100 milliseconds.

Due to the nature of frequent GSM tune aways, the possibility of tune away requests occurring during an uninterruptable LTE operation may be high. For example, in LTE idle mode, LTE neighbor cell search and/or measurement may be classified as uninterruptible operation. Accordingly, if a GSM tune away request occurs during LTE neighbor cell search and/or measurement (e.g., for GSM page decoding), the tune away for GSM may be delayed approximately 30 ms until the measurement operation is complete. While this may be acceptable for a 1x tune away case, it may result in a higher GSM page miss rate due to the short duration of GSM paging.

Accordingly, to reduce GSM page miss rate due to uninterruptible LTE searching and/or measurement activity that may deny GSM tune-away request in LTE idle mode, LTE search and/or measurement may be further divided into smaller atomic operations at different stages. In particular, since GSM tune away duration may be very small (e.g., about 10-20 ms), it may be added between LTE search and/or measurement stages without degrading LTE performance significantly.

In LTE idle mode, neighbor cell search may include intra cell search, inter-frequency cell search, and inter-RAT cell search. Intra cell search may include serving cell sample collection on half frame and PSS/SSS (primary synchronization signal/secondary synchronization signal) detection within it. Inter-frequency cell search may include multiple cycles of tuning on inter-frequency, inter-frequency cell sample collection on half frame, and PSS/SSS detection within it. Inter-RAT cell search may include multiple cycles of tuning on inter-RAT frequencies, inter-RAT cell sample collection, and inter-RAT cell signature search within it.

In one embodiment, if a GSM tune away request occurs in the middle of LTE neighbor cell search, the GSM tune away may be inserted just before next intra/inter-frequency/inter-RAT frequency tuning. For example, if the GSM tune-away request happens on tuning on inter-frequency F1 for frequency F1 cell search, after sample collection is completed on frequency F1, the radio frequency circuitry can be tuned to the GSM frequency to collect GSM samples (e.g., for page decoding), while in the meantime, inter-frequency F1 cell search can be performed on the collected samples on frequency F1. When GSM sample collection is complete, the radio frequency circuitry can be tuned to next inter-frequency F2 to collect samples on F2, while GSM samples can be passed to GSM for GSM page decoding. This embodiment may effectively make the GSM tune-away as part of the cell search procedure, e.g., with the only difference being that the GSM samples collected by GSM tune away are used for GSM page decoding, instead of normal cell signature detection.

In one embodiment, in LTE idle mode, neighbor cell measurement may include intra cell measurement, inter-frequency cell measurement, and inter-RAT cell measurement. Each type of measurement may include radio frequency tuning on the related frequency and collection of samples, followed by measuring the reference signal power/energy within the samples. A GSM tune away can be inserted just before the next radio frequency tuning for related measurement frequency, instead of delaying until entire measurement operation is completed for LTE. For example, measurement of cells of frequency F1 for LTE with a GSM tune-away on Frequency F3 can be inserted just before tune to F2 for LTE, e.g., F1->F3 (GSM)->F2. This embodiment may effectively make the GSM tune away as part of the cell measurement procedure for LTE (e.g., in response to the GSM paging occurring within the measurement operation), except that GSM samples collected by GSM tune away may be used for GSM page decoding, instead of normally for cell reference signal measurement. The following frequency patterns are exemplary only: F0->F3 (GSM)->F1->F2 (e.g., if GSM comes in before F1 is tuned or cancel F1 for F3 and resume F1 after F3), F0->F1->F3 (GSM)->F2 (e.g., if GSM comes in after F1 is already tuned or in cases where F1 is completed and GSM is inserted after completion).

A GSM tune away may occur during intra-cell LTE measurement. For example, the radio may be tuned to the serving cell frequency F0 while performing intra-cell LTE measurement when the GSM request occurs. In one embodiment, the radio may immediately tune to GSM to perform GSM procedures (e.g., page decoding) and then may tune back to F0 in order to complete intra-cell LTE measurement. Alternatively, after completing GSM procedures, the radio may be tuned to F1 of LTE to perform inter-cell or inter-RAT measurements, instead of returning to F0, as desired. In this case, the radio may be later tuned back to F0 to complete intra-cell measurement, if desired. The following frequency patterns are exemplary only: F0->F3 (GSM)->F0->F1->F2->etc.; F0->F3 (GSM)->F1->F2-> . . . F0; F3 (GSM)->F0->F1->F2->etc.

These embodiments may result in reduction of GSM tune away max delay down to about 5 ms, which may be used to collect LTE half frame samples. These embodiments may dramatically reduce GSM page miss rate due to denying a GSM tune away when cell search and/or measurement is on-going for LTE.

Figure 10:
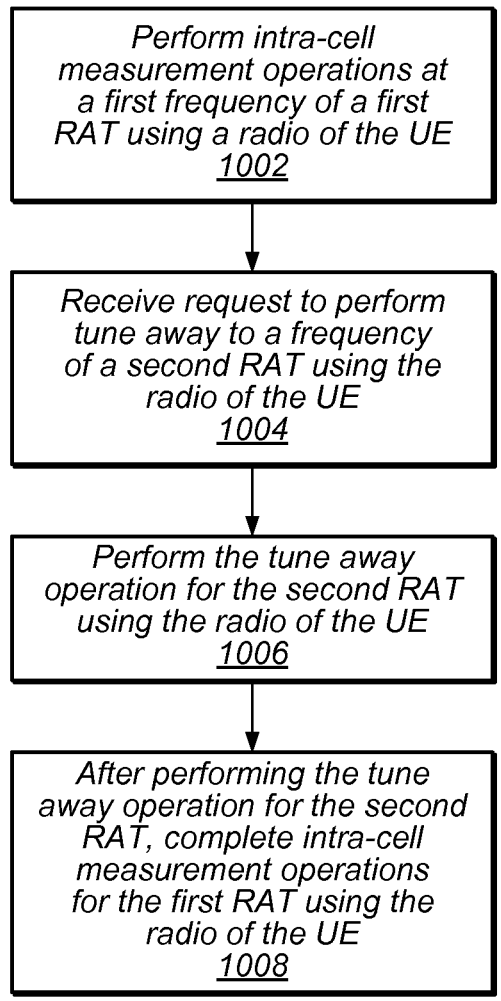
FIG. 10 is a flowchart diagram illustrating an exemplary method for inserting tune away of a second RAT in Intra-Cell Measurement for a First RAT.

FIG. 10—Inserting Tune Away of a Second RAT in Intra-Cell Measurement for a First RAT FIG. 10 is a flowchart diagram illustrating a method for inserting page decoding (or other procedures) of a second RAT within measurement of a first RAT. The method of FIG. 10 may be performed by a UE device (such as UE 106) that uses a first radio for both the first RAT and the second RAT (e.g., LTE and GSM, although other combinations of RATs are envisioned). The method shown in FIG. 9 may be used in conjunction with any of the systems or devices shown in the above Figures, among other devices. In various embodiments, some of the method elements shown may be performed concurrently, in a different order than shown, or may be omitted. Note also that additional method elements may also be performed as desired. The method may be performed as follows.

In 1002, the UE may perform intra-cell measurement operations at a first frequency of the first RAT. For example, the UE may wake from idle mode and may operate at the first frequency in a first cell of the first RAT and then may perform intra-cell measurement of the first RAT.

In 1004, the UE may receive a request to perform tune-away to a frequency of the second RAT, e.g., while the UE is tuned to the first frequency of the first RAT to perform intra-cell measurement operations. The request may be received prior to completion of the intra-cell measurement operations of the first RAT.

In 1006, in response to the tune-away request from the second RAT, the UE may perform the tune-away operations for the second RAT. More specifically, the UE may tune the first radio from the first frequency of the first RAT to a frequency of the second RAT in order to perform the tune-away operation (e.g., page decoding for the second RAT). In some embodiments, the tune-away operations may include gathering samples for the frequency of the second RAT and then performing searching or analysis of those samples. In some embodiments, the UE may immediately tune away to the frequency of the second RAT in response to the tune-away request (e.g., without any substantial delay). Alternatively, the UE may introduce a small delay, e.g., if samples are still being collected, such as in cases where the sample collection is almost complete.

In 1008, after 1006, the intra-cell measurement operations for the first RAT may be completed. In some embodiments, completion of the intra-cell measurement operations may be performed immediately after the tune-away operations of the first RAT. Alternatively, after the tune-away operation of the first RAT, other measurement operations (e.g., inter-cell or inter-RAT) may be performed for the first RAT. For example, instead of tuning back to the first frequency (e.g., the serving frequency) of the first RAT after the tune away operation of the second RAT, the radio of the UE may be tuned to a second frequency of the first RAT, e.g., for performing inter-cell measurements. After these other measurement operations, the radio may be tuned back to the first frequency to complete intra-cell measurements.

In some embodiments, the gathering of samples (e.g., for the various measurements of the first RAT and/or the tune-away operation of the second RAT) and analysis of those gathered samples may be pipelined. For example, samples may be gathered for a frequency and immediately the radio may be tuned to a new frequency to gather additional samples while, at the same time, the samples for the prior frequency are analyzed, thus increasing efficiency of the overall process.

Figure 11A:
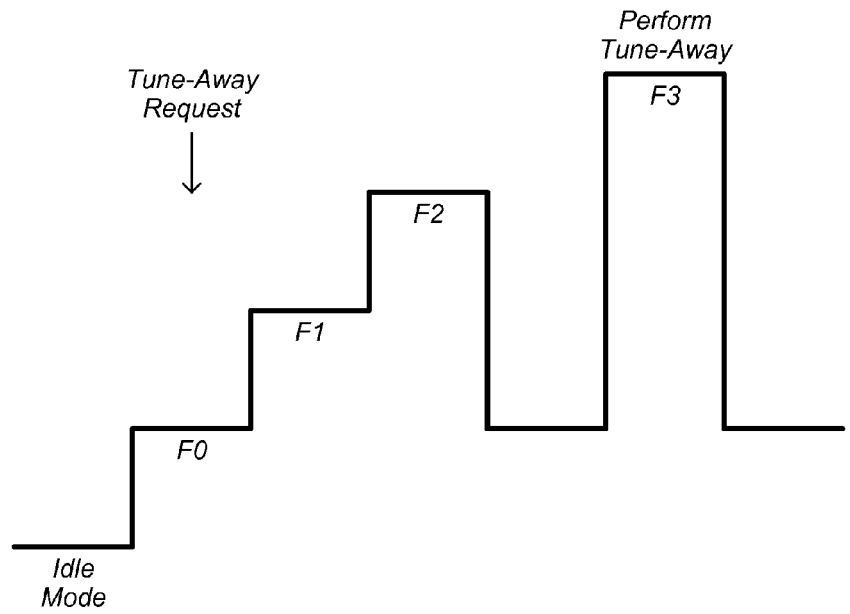
FIGS. 11A and 11B are diagrams corresponding to embodiments of the method of FIG. 10.
Figure 11B:
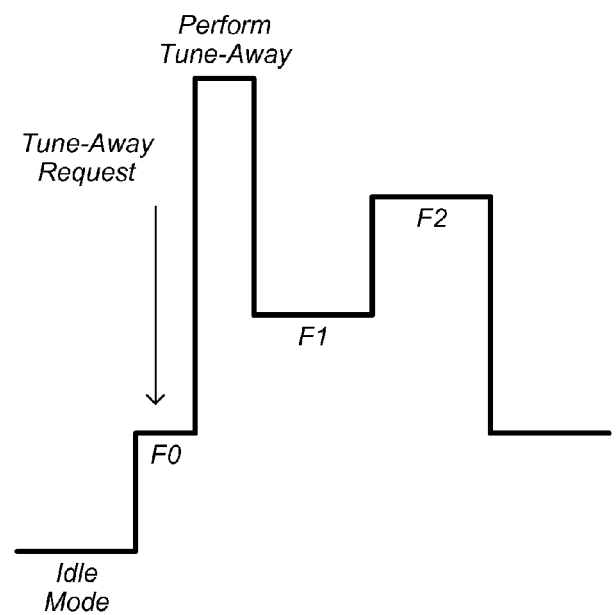

FIGS. 11A and 11B

FIGS. 11A and 11B illustrate an exemplary diagram corresponding to one embodiment of the method of FIG. 10. In particular, FIGS. 11A and 11B illustrate a case where the tune away request of the second RAT is received during intra-cell measurements for the first RAT.

In particular, as shown in FIG. 11A, the UE is initially in idle mode, and then tunes to the serving frequency of the first RAT (F0). In the serving frequency, the UE may perform intra-cell measurements. During this time, the UE receives a tune away request of the second RAT. In this case, the UE completes intra-cell measurement and continues on to perform inter-cell and/or inter-RAT measurement in frequencies F1 and F2. After, the UE tunes back to the serving frequency of the first RAT (F0) and then tunes to F3 for performing the tune away operation of the second RAT.

In FIG. 11B, a similar situation is shown. However, in FIG. 11B, when the tune away request is received for the second RAT, the UE tunes the radio from the serving frequency of the first RAT to the frequency of the second RAT (F3) in order to perform the tune away operation (e.g., page decoding). Then, the UE tunes the radio directly to F1 followed by F2 to perform the inter-cell and/or inter-RAT measurement for the first RAT. The UE can then tune back to F0, e.g., to complete the intra-cell measurement of the first RAT.

Figure 12:
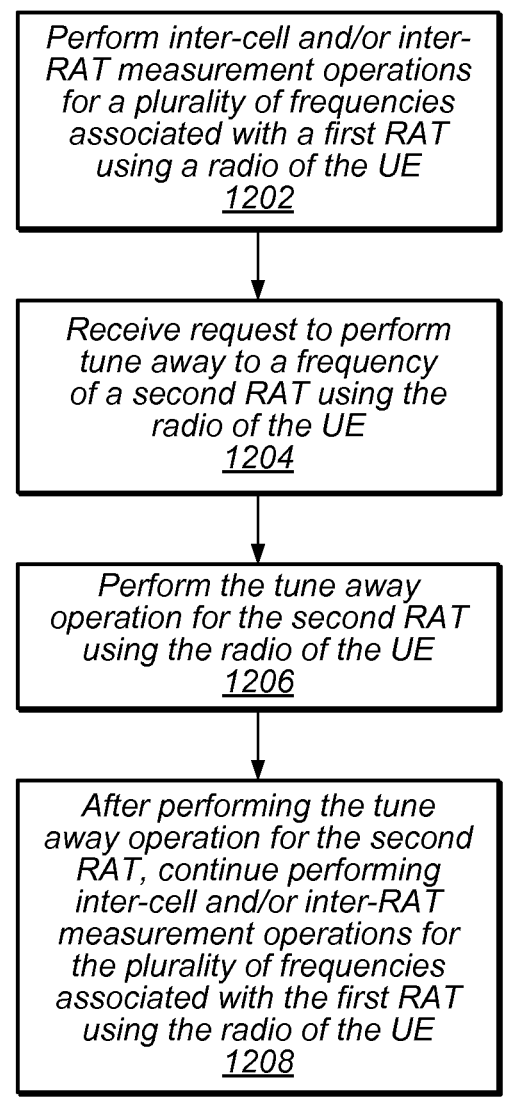
FIG. 12 is a flowchart diagram illustrating an exemplary method for inserting tune away of a second RAT in Inter-Cell and/or Inter-RAT Measurement for a First RAT.

FIG. 12—Inserting Tune Away of a Second RAT in Inter-Cell and/or Inter-RAT Measurement for a First RAT FIG. 12 is a flowchart diagram illustrating a method for inserting page decoding (or other procedures) of a second RAT within measurement of a first RAT. The method of FIG. 12 may be performed by a UE device (such as UE 106) that uses a first radio for both the first RAT and the second RAT (e.g., LTE and GSM, although other combinations of RATs are envisioned). The method shown in FIG. 9 may be used in conjunction with any of the systems or devices shown in the above Figures, among other devices. In various embodiments, some of the method elements shown may be performed concurrently, in a different order than shown, or may be omitted. Note also that additional method elements may also be performed as desired. The method may be performed as follows.

In 1202, the UE may perform inter-cell measurement and/or inter-RAT operations for a first RAT. Performing inter-cell and/or inter-RAT measurement operations may include repeatedly performing measurement operations on different frequencies of the first RAT by tuning the first radio to a new frequency of the first RAT (e.g., corresponding to a neighboring cell of the first RAT) and performing measurements on that new frequency of the first RAT. Inter-cell and/or inter-RAT measurement operations may be performed for a plurality of frequencies, e.g., including a first frequency (e.g., "F1"), a second frequency (e.g., "F2"), etc. For inter-cell measurements, each of these frequencies may be associated with the first RAT, e.g., base stations of the first RAT.

In 1204, the UE may receive a request to perform tune-away to a frequency of the second RAT, e.g., while the UE is tuned to a frequency of the plurality of frequencies of 1102. For example, the request may be to perform page decoding for the second RAT.

In 1206, in response to the tune-away request from the second RAT, the UE may perform the tune-away operations for the second RAT. More specifically, the UE may tune the first radio from the current frequency of the plurality of frequencies associated with the measurement operations of the first RAT to a frequency of the second RAT in order to perform the tune-away operation of the second RAT (e.g., page decoding for the second RAT). In some embodiments, the tune-away operations may include gathering samples for the frequency of the second RAT and then performing searching or analysis of those samples. In some embodiments, the UE may immediately tune away to the frequency of the second RAT in response to the tune-away request (e.g., without any substantial delay). Alternatively, the UE may introduce a small delay, e.g., if samples are still being collected, such as in cases where the sample collection is almost complete.

In 1208, after 1206, the UE may continue performing inter-cell measurements. More specifically, the UE may tune the first radio from the frequency of the second RAT to one of the plurality of frequencies for performing measurements associated with the first RAT. In one embodiment, the UE may tune the first radio to the frequency that was tuned away from in 1206 (e.g., if measurement was not completed for that frequency). Alternatively, the UE may tune the first radio to a next frequency of the plurality of frequencies to continue performing measurements associated with the first RAT (e.g., if the previous frequency was already completed and/or if it was not, but completing the frequency did not need to occur and/or could be completed at a later time).

Similar to discussions above, in some embodiments, the gathering of samples (e.g., for the various measurements of the first RAT and/or the tune-away operation of the second RAT) and analysis of those gathered samples may be pipelined. For example, samples may be gathered for a frequency and immediately the radio may be tuned to a new frequency to gather additional samples while, at the same time, the samples for the prior frequency are analyzed, thus increasing efficiency of the overall process.

Figure 13A:
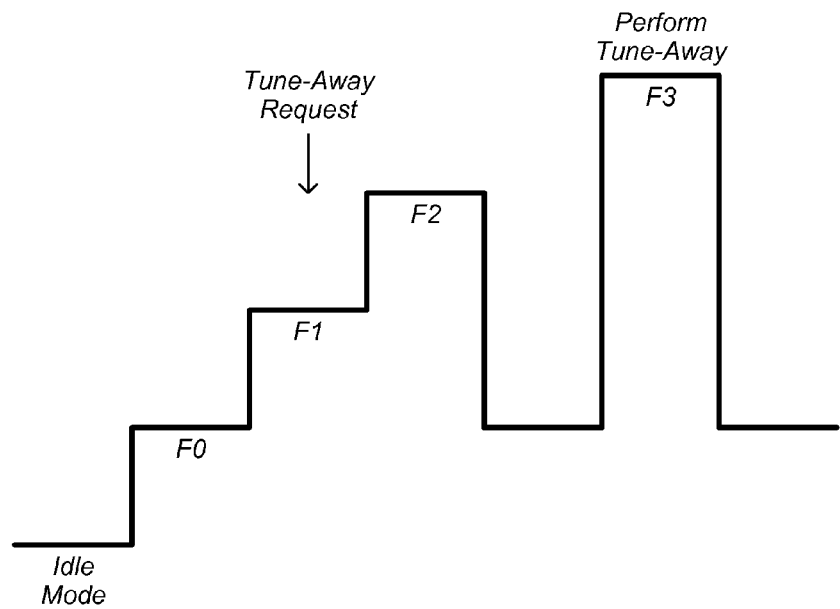
FIGS. 13A and 13B are diagrams corresponding to embodiments of the method of FIG. 12.
Figure 13B:
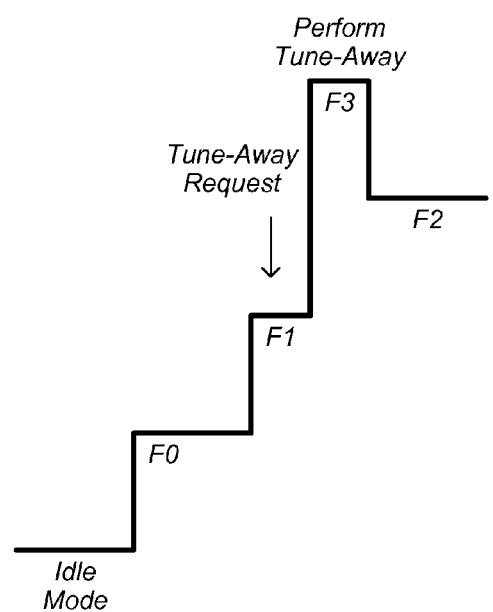

FIGS. 13A and 13B

FIGS. 13A and 13B illustrate an exemplary diagram corresponding to one embodiment of the method of FIG. 12. In particular, FIGS. 13A and 13B illustrate a case where the tune away request of the second RAT is received during inter-cell and/or inter-RAT measurements for the first RAT.

In particular, as shown in FIG. 11A, the UE is initially in idle mode, and then tunes to the serving frequency of the first RAT (F0). The UE then begins inter-cell and/or inter-RAT measurements at frequency F1 for the first RAT. While tuned to F1, the UE receives a tune away request of the second RAT. In this case, the UE completes inter-cell and/or inter-RAT measurement in frequencies F1 and F2. After, the UE tunes back to the serving frequency of the first RAT (F0) and then tunes to F3 for performing the tune away operation of the second RAT.

In FIG. 11B, a similar situation is shown. However, in FIG. 11B, when the tune away request is received for the second RAT while tuned to F1, the UE tunes the radio from F1 of the first RAT to the frequency of the second RAT (F3) in order to perform the tune away operation (e.g., page decoding). Then, the UE tunes the radio directly to F2 to continue to perform the inter-cell and/or inter-RAT measurement for the first RAT. The UE can then tune back to F0.

In the example of FIG. 11B, the UE may have received enough samples in F1 to be able to perform detection on the samples while tuning to F3 for the second RAT, e.g., following the pipelining embodiments discussed above.

Inserting Page Decoding of a Second RAT in Warm Up for a First RAT

As discussed above, a UE may use a single radio (e.g., having a single transmit chain and a single receive chain) to communicate using two different RATs. For example, the UE may use a single radio to communicate using a first RAT and may periodically tune away in order to perform various actions for a second RAT, such as page decoding, measurement, synchronization, etc. Note that the radio may be the single cellular radio for the UE or may be one of a plurality of cellular radios. In a multiple radio embodiment, and one of the cellular radios may be used for time-sharing of the first RAT and the second RAT, e.g., while the other radio is asleep or used for other purposes. Additionally, the UE may implement dual SIM dual active (DSDA) and/or dual SIM dual standby (DSDS), as desired.

In one embodiment, the first RAT may be LTE and the second RAT may be GSM or the first RAT may be GSM and the second RAT may be LTE, although other combinations of RATs are envisioned. In some cases, it may be typical to tune away periodically in order to perform measurement and/or synchronization for the second RAT (e.g., for neighboring base stations of the current base station of the second RAT). In the following, the first RAT may be described as LTE and the second RAT may be described as GSM, but any of these descriptions may apply to other RATs, as desired.

In comparison to CDMA 2000 1x, SRLTE for GSM may have significant differences. For example, GSM tune-away (e.g., for page decoding) may be 10 times more frequent (e.g., at least once per 470 ms) than 1x tune-way which is once per 5.21 s. Additionally, in most cases, the duration of each GSM tune-away may be very short, e.g., 10-20 milliseconds, while in most cases duration of 1x tune-away may be 90-100 milliseconds.

CDRX (e.g., in LTE connected mode) provides fast data access response time while conserving power by going to sleep whenever there are no transmissions (e.g., data transmissions). A typical CDRX cycle for LTE is 320 ms. Additionally, as mentioned above, GSM tune-aways are fairly frequent (e.g., once per 470 ms). As a result, it is fairly likely that a GSM tune-away request may occur during an LTE CDRX wakeup period, which include crystal oscillator warm up, radio frequency chain configuration, and Time/Frequency Tracking loop (TTL/FTL) warm up. This CDRX wakeup period normally takes 17 ms to 25 ms (e.g., including radio frequency circuitry warm up—8 ms, TTL/FTL warm up 8 ms-17 ms, and radio frequency configuration 2-3 ms) which is a long enough to cause GSM to miss a potential page during page decoding if the GSM tune-away is delayed.

The following embodiments may resolve or minimize this issue.

Crystal oscillator warm up is common for either LTE wakeup or GSM wakeup. Additionally, radio frequency chain configuration for LTE is also needed for creating a tune-back radio frequency script which, when executed, may reconfigure only the difference between LTE and GSM radio frequency configuration for the radio frequency chain interface, e.g., so that tune-back from GSM to LTE takes minimal time.

TTL/FTL warm up may be used for re-verification of LTE time tracking error and frequency tracking error due to sleep. Although it may be necessary for LTE transmission and receiving at correct timing and frequency after wakeup, it can be delayed until after the GSM tune-away. Accordingly, if the GSM tune-away request happens during radio frequency warm up and radio frequency configuration, the radio frequency warm up and configuration can be delayed until it is completed. In another case, if GSM tune away request happens during TTL/FTL warm-up, the TTL/FTL warm-up can be cancelled and the radio frequency circuitry can be immediately tuned to GSM frequency to collect GSM samples and start GSM processing, such as page decoding.

Accordingly, when the radio frequency circuitry is tuned back from GSM, LTE TTL/FTL warm-up procedure can be restarted, and LTE transmission and receiving then can be resumed after TTL/FTL warm-up completes.

By implementing these embodiments, fewer GSM page may be missed while LTE performance degradation may be minimized.

Figure 14:
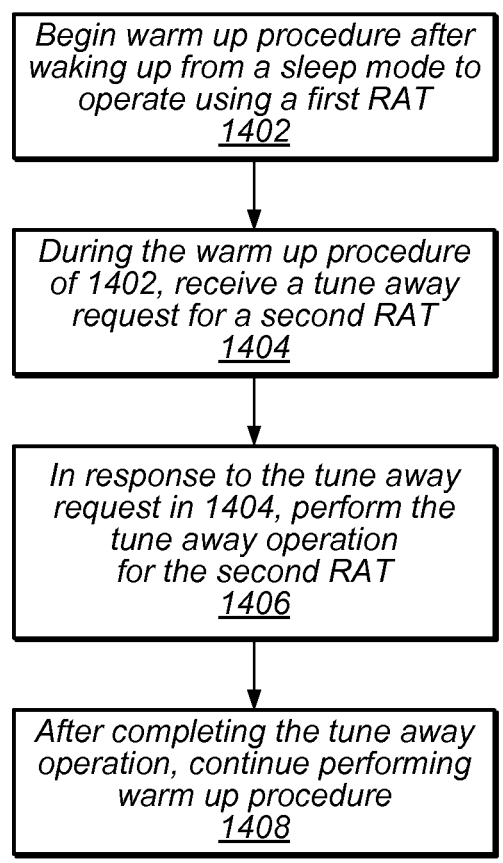
FIG. 14 is a flowchart diagram illustrating an exemplary method for inserting tune away of a second RAT during Warm Up of a First RAT.

FIG. 14—Inserting Tune Away of a Second RAT in Warm Up for a First RAT

FIG. 14 is a flowchart diagram illustrating a method for inserting page decoding (or other procedures) of a second RAT within warm up of a first RAT. The method of FIG. 14 may be performed by a UE device (such as UE 106) that uses a first radio for both the first RAT and the second RAT (e.g., LTE and GSM, although other combinations of RATs are envisioned). The method shown in FIG. 13 may be used in conjunction with any of the systems or devices shown in the above Figures, among other devices. In various embodiments, some of the method elements shown may be performed concurrently, in a different order than shown, or may be omitted. Note also that additional method elements may also be performed as desired. The method may be performed as follows.

In 1402, the UE may begin waking up from a sleep mode to operate in a first RAT. The UE may have been in a sleep mode for the first RAT, circuitry associated with the first RAT, the first radio or radio frequency circuitry of the first radio, the UE in general, and/or other portions or components of the UE, as desired. Generally, immediately prior to waking up in 1402, the UE may not have been actively using the first radio to perform communication using the first RAT.

The wake up procedure of 1402 may include one or more of performing a crystal oscillator warm up (e.g., providing power to the crystal oscillator and wait for it to warm up and/or stabilize), performing radio frequency circuitry warm up, performing start-up operations of a processor (e.g., a CPU) of the UE, and/or performing tracking loop operations (such as time tracking loop and/or frequency tracking loop operations) to synchronize operations with a base station of the first RAT. In one embodiment, the crystal oscillator may be used for operating a first clock that may be used for communication using the first RAT.

In 1404, during the warm up procedure of 1402, a tune away request may be received for the second RAT, e.g., to perform page decoding for the second RAT.

In 1406, in response to the tune away request in 1404, the tune away operation may be performed. For example, the first radio of the UE may be tuned to a frequency of the second RAT to perform the tune away operation (e.g., page decoding).

However, the timing of the receipt of the tune away request with respect to the wake up procedures may affect when the tune away operation is performed. For example, if the tune away request is received prior to performing the timing loop operations (e.g., during crystal oscillator warm up, radio frequency circuitry warm up, and/or start-up operations of the processor), then the tune away operation may be performed after start-up operations of the CPU and prior to the timing loop operations. However, if the tune away request is received during the timing loop operations, then the timing loop operations may be cancelled, and the tune away operation of the second RAT may be performed. In this case, the timing loop operations may be completed or restarted after the tune away operation of the second RAT.

In 1408, after performing the tune away operation in 1306, the wake up procedure of 1402 may be completed. In particular, in 1408, the timing loop operations of the wake up procedure of 1402 may be performed.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
    at a user equipment device (UE) comprising a first radio, wherein the first radio is configurable to operate according to a first radio access technology (RAT) and a second RAT:
        performing communication with a first base station of the first RAT at a first frequency of the first RAT, wherein upcoming tune-away operations at a second frequency of the first RAT is scheduled;
        receiving a request for performing tune-away operations at a frequency of the second RAT while the UE is operating at the first frequency of the first RAT, wherein the request for the tune-away to the frequency of the second RAT occurs prior to start of the upcoming tune-away operations at the second frequency of the first RAT and conflicts with the upcoming tune-away operations at the second frequency of the first RAT;
        performing the tune-away operations at the frequency of the second RAT, wherein said performing the tune-away operations at the frequency of the second RAT operates to delay the upcoming tune-away of the first RAT;

after completion of the tune-away operations to the frequency of the second RAT, tuning the first radio directly to the second frequency of the first RAT to perform the tune-away operations at the second frequency of the first RAT, wherein said tuning the first radio directly to the second frequency of the first RAT does not involve tuning the first radio back to the first frequency of the first RAT between said completion of the tune-away operations at the frequency of the second RAT and said tuning the first radio to the second frequency of the first RAT; and
performing the tune-away operations of the first RAT at the second frequency of the first RAT.

2. The method of claim 1, wherein the tune-away operations at the frequency of the second RAT comprise performing page decoding associated with the second RAT.

3. The method of claim 1, wherein the tune-away operations at the frequency of the second RAT comprise performing synchronization associated with the second RAT.

4. The method of claim 1, wherein the tune-away operations at the second frequency of the first RAT comprise performing neighbor base station measurement for the first RAT.

5. The method of claim 1, further comprising:
tuning the first radio back to the first frequency of the first RAT after said performing the tune-away operations of the first RAT at the second frequency of the first RAT.

6. The method of claim 1, wherein UE comprises a single radio for performing cellular communication and wherein the first radio is the single radio.

7. The method of claim 1, wherein the first RAT comprises long term evolution (LTE).

8. The method of claim 1, wherein the second RAT comprises global system for mobile communications (GSM).

9. The method of claim 1, wherein the UE comprises two smart cards which each implement SIM (Subscriber Identity Module) functionality, wherein the UE implements DSDA (Dual SIM Dual Active) functionality.

10. A user equipment device (UE), comprising:
a first radio, wherein the first radio is configured to perform communication using a first radio access technology (RAT) and a second RAT and maintain a connection to both the first RAT and the second RAT; and
one or more processors coupled to the first radio, wherein the one or more processors and the first radio are configured to:
perform communication with a first base station of the first RAT at a first frequency of the first RAT;
perform tune-away operations at a second frequency of the first RAT, wherein said performing the tune-away operations comprises tuning the first radio to the second frequency of the first RAT;
receive a request to perform tune-away operations at a frequency of the second RAT while performing the tune-away operations of the first RAT at the second frequency of the first RAT;
after receiving the request, complete performance of the tune-away operations at the second frequency of the first RAT;
after completing performance of the tune-away operations at the second frequency of the first RAT, performing the tune-away operations at the frequency of the second RAT, wherein performing the tune-away operations at the frequency of the second RAT comprises tuning the first radio directly from the second frequency of the first RAT to the frequency of the second RAT, wherein said tuning the first radio directly to the frequency of the second RAT does not involve tuning the first radio back to the first frequency of the first RAT between said completing performance of the tune-away operations at the second frequency of the first RAT and tuning the first radio to the frequency of the second RAT.

11. The UE of claim 10, wherein the tune-away operations at the frequency of the second RAT comprise performing page decoding associated with the second RAT.

12. The UE of claim 10, wherein the tune-away operations at the frequency of the second RAT comprise performing synchronization associated with the second RAT.

13. The UE of claim 10, wherein the tune-away operations at the second frequency of the first RAT comprise performing neighbor base station measurement for the first RAT.

14. The UE of claim 10, wherein the one or more processors are further configured to:
tune the first radio back to the first frequency of the first RAT after said performing the tune-away operations at the frequency of the second RAT.

15. The UE of claim 10, wherein UE comprises a single radio for performing cellular communication and wherein the first radio is the single radio.

16. The UE of claim 10, wherein the first RAT comprises long term evolution (LTE) and wherein the second RAT comprises global system for mobile communications (GSM).

17. The UE of claim 10, wherein the UE comprises two smart cards which are each configured to implement SIM (Subscriber Identity Module) functionality, wherein the UE is configured to implement DSDA (Dual SIM Dual Active) functionality using the first radio.

18. A non-transitory, computer accessible memory medium storing program instructions for execution by a user equipment device (UE), wherein the UE comprises a first radio for communicating using a first radio access technology (RAT) and a second RAT, wherein the program instructions are executable by a processor to:
perform communication with a first base station of the first RAT at a first frequency of the first RAT, wherein upcoming tune-away operations at a second frequency of the first RAT is scheduled;
receive a request for performing tune-away operations at a frequency of the second RAT while the UE is operating at the first frequency of the first RAT;
if the request for the tune-away to the frequency of the second RAT occurs prior to start of the upcoming tune-away operations at the second frequency of the first RAT and conflicts with the upcoming tune-away operations at the second frequency of the first RAT, perform the tune-away operations at the frequency of the second RAT followed by performing the tune-away operations at the second frequency of the first RAT; and
if the request for the tune-away to the frequency of the second RAT occurs after the start of the upcoming tune-away operations at the second frequency of the first RAT, perform the tune-away operations at the second frequency of the first RAT followed by the tune-away operations at the frequency of the second RAT.

19. The non-transitory, computer accessible memory medium of claim 18, wherein if the request for performing the tune-away operations at the frequency of the second RAT occurs prior to the start of the upcoming tune-away operations at the second frequency of the first RAT, after completing the tune-away operations at the frequency of the second RAT, the program instructions are further executable to:
tune the first radio directly to the second frequency of the first RAT to perform the tune-away operations at the second frequency of the first RAT, wherein tuning the first radio directly to the second frequency of the first RAT does not involve tuning the first radio back to the first frequency of the first RAT between completing the tune-away operations at the frequency of the second RAT and tuning the first radio to the second frequency of the first RAT.

20. The non-transitory, computer accessible memory medium of claim 18, wherein if the request for performing the tune-away operations at the frequency of the second RAT occurs after the start of the upcoming tune-away operations at the second frequency of the first RAT, after completing the tune-away operations at the second frequency of the first RAT, the program instructions are further executable to:

tune the first radio directly to the frequency of the second RAT to perform the tune-away operations at the frequency of the second RAT, wherein tuning the first radio directly to the frequency of the second RAT does not involve tuning the first radio back to the first frequency of the first RAT between completing the tune-away operations at the second frequency of the first RAT and tuning the first radio to the frequency of the second RAT.

* * * * *